UNITED STATES PATENT OFFICE.

EDMUND KOELITZ, OF ZEHLENDORF, BERLIN, GERMANY, ASSIGNOR TO S. OPPENHEIMER, OF DUSSELDORF, GERMANY.

METHOD OF PRODUCING DRY YEAST.

1,033,807.          Specification of Letters Patent.      Patented July 30, 1912.

No Drawing.      Application filed February 27, 1912. Serial No. 680,344.

*To all whom it may concern:*

Be it known that I, EDMUND KOELITZ, a citizen of the Empire of Germany, residing at Zehlendorf, Berlin, Germany, have invented a new and useful Method of Producing Dry Yeast, of which the following is a specification.

This invention relates to a novel method of treating pressed grain yeast so as to convert it into a sound dry yeast.

The pressed grain yeast now in the market is very apt to spoil owing to the moisture contained therein. It consists of a multitude of microscopic yeast-cells, which are extremely sensitive to high temperature and infection and consequently possess but a short life. Under favorable conditions the pressed grain yeast may be kept for 8 to 10 days in a fit state, while in summer, it can no longer be used after the lapse of three to four days.

The attempts hitherto made to produce a viable dry yeast have all proven unsatisfactory and consequently the product was useless for commercial purposes. When 100 cells of the wet pressed yeast capable of growth were dried, only from 7 to 10 cells in the product were found to be still alive. So also the relatively high price of production rendered a general use of this dry yeast impracticable.

I have succeeded in devising a method by which up to 100 per cent. of viable yeast cells may be obtained. I have arrived at the solution of this problem by the following considerations and conclusions: In general the yeast has by no means the short life inherent in yeast used for baking purposes. On the contrary it is well known that the yeast in a "wild" state can live for months without being destroyed by self-consumption or exterior influences. It winters in vineyards and orchards and infects the atmosphere so frequently as to produce a fermentation at every place where there exist suitable solutions of sugar. As this wild yeast is permanently exposed to the atmosphere, it is to be presumed that the drying of the several cells is effected very quickly, more particularly on dry autumn days. Furthermore it is to be noted that the intrinsic value of the yeast for baking purposes depends not only upon its contents of alcoholase but more particularly upon its faculty of quickly forming the enzym. The stability of the alcoholase in a dry condition is good. As acids are injurious to the alcoholase, they should be avoided as much as possible in dry yeasts. Moreover as the alcohol is also injurious to the alcoholase, the alcohol formed during the enrichment of the yeast with nutritive materials should be removed by aeration. The less moisture there is contained in the yeast, the better its contents of alcoholase will be preserved. Higher temperatures should be avoided in the process, since they favor the formation of endotryptase, which reduces the fermenting power of the yeast. Asparagin, on the contrary assists in the formation of alcoholase in the living cell and is indispensable for the manufacture of dry yeast. Finally I have observed, that only a good physiological condition of the material, prior to the drying, is essential for obtaining a good dry yeast. In order to attain this condition, highly diluted solutions of d-glucose, d-fructose, saccharose and maltose may be used. After the enrichment of the yeast with these nutritive materials, a dose of asparagin is added, whereupon the mixture is dried as rapidly as possible.

Example: For the production of 250 kilograms of dry yeast, about 750 kilograms of pressed yeast are required. The solution of sugar for the physiologic freshening-up of the yeast required to be highly diluted and its concentration should never exceed 2° Balling at most. The weight of the raw yeast should be in the proportion of 2:1 to the weight of the sugar. In this nutritive liquid, the raw yeast is thoroughly dissolved at a temperature of 19° centigrade, while being energetically agitated up to 12 or 15 hours in a well ventilated room. During this process, the yeast should not ferment, but should absorb the sugar by diffusion. The solution should remain as neutral as possible and care should be taken, that also during ventilation, the yeast will not become acidulated. If necessary, the acid should be neutralized by means of a diluted solution of soda. During the ventilation, the temperature may be slowly raised, but it should never exceed 25° centigrade. After the lapse of from 12 to 15 hours, the yeast may be allowed to stand up to 10 hours, before it is separated, or it may be at once separated. The separated yeast is well washed out and is then rapidly compressed so strongly as to be rendered as dry as possible. The resultant pressed yeast is at once carefully kneaded while adding a solution of asparagin in the proportion of about 5 grams of asparagin to 50 kilograms of yeast. The kneaded yeast is rapidly formed into filaments and is finally dried on drying frames, by means of a current of cold air.

It is obvious that the dry yeast produced as described should be well protected from moisture. It is preferably kept in hermetically closed vessels containing suitable hygroscopic agents.

I claim:

1. The herein described method of producing dry yeast, which consists in freshening up pressed grain yeast of commerce with a diluted sugar solution while strongly agitating the yeast and ventilating the room, separating and washing out the freshened-up yeast, pressing the washed-out yeast as rapidly and strongly as possible, kneading the pressed yeast with a solution of asparagin, turning the kneaded yeast into filaments and drying said filaments by means of a current of cold air.

2. The herein described method of producing dry yeast, which consists in freshening up pressed grain yeast of commerce with diluted solutions of d-glucose, d-fructose, saccharose and maltose while strongly agitating the yeast and ventilating the room, separating and washing out the freshened-up yeast, pressing the washed-out yeast as rapidly and strongly as possible, kneading the pressed yeast with a solution of asparagin, turning the kneaded yeast into filaments and drying said filaments by means of a current of cold air.

3. The herein described method of producing dry yeast, which consists in dissolving 2 parts by weight of pressed grain yeast of commerce in a diluted solution of one part of sugar while energetically agitating the yeast and ventilating the room, also preventing the yeast from acidifying, separating the treated yeast, washing out the separated yeast, pressing the washed-out yeast as rapidly and strongly as possible, kneading the pressed yeast with a solution of asparagin, turning the kneaded yeast into filaments and drying said filaments by means of a current of cold air.

4. The herein described method of producing dry yeast, which consists in dissolving 2 parts by weight of pressed grain yeast of commerce in a diluted solution of one part of sugar while energetically agitating the yeast and ventilating the room, the sugar consisting of d-glucose, d-fructose, saccharose and maltose in like quantities, further separating the treated yeast, washing-out the separated yeast, pressing the washed-out yeast as rapidly and strongly as possible, kneading the pressed yeast with a solution of asparagin, turning the kneaded yeast into filaments, and drying said filaments by means of a current of cold air.

EDMUND KOELITZ

Witnesses:
WOLDEMAR HAUPT,
HENRY HASPER.